(12) United States Patent
Pfefferl et al.

(10) Patent No.: US 8,467,950 B1
(45) Date of Patent: Jun. 18, 2013

(54) AIR DEMAND ADJUSTED COMPRESSOR CONTROL

(75) Inventors: David J. Pfefferl, Broadview Heights, OH (US); Mark A. Matko, North Olmsted, OH (US); Majed M. Hamdan, North Olmsted, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 13/368,517

(22) Filed: Feb. 8, 2012

(51) Int. Cl.
*B60L 11/00* (2006.01)
*F02D 41/00* (2006.01)

(52) U.S. Cl.
USPC ...................................... 701/100; 123/339.17

(58) Field of Classification Search
USPC ...... 701/22, 78, 83, 100; 123/339.17; 417/18, 417/279, 302; 303/11, 57, 59, 155; 322/11; 95/19; 60/329
See application file for complete search history.

(56) References Cited

U.S. PATENT DOCUMENTS

| | | | |
|---|---|---|---|
| 4,201,517 A | 5/1980 | Ferguson | |
| 5,627,769 A * | 5/1997 | Hallikainen | 700/301 |
| 6,089,831 A | 7/2000 | Bruehmann et al. | |
| 6,394,758 B1 | 5/2002 | Lee et al. | |
| 6,534,958 B1 | 3/2003 | Graber et al. | |
| 7,226,273 B2 | 6/2007 | Doerr et al. | |
| 7,344,201 B1 | 3/2008 | Bates | |
| 7,608,132 B2 | 10/2009 | Fornof et al. | |
| 2002/0112489 A1 | 8/2002 | Egawa et al. | |
| 2010/0199950 A1 | 8/2010 | Renner | |
| 2012/0237367 A1 * | 9/2012 | Cunningham et al. | 417/55 |

\* cited by examiner

*Primary Examiner* — Mary Cheung
(74) *Attorney, Agent, or Firm* — Fay Sharpe LLP (57) ABSTRACT

A motor controller unit facilitates modifying pressure thresholds and motor operation mode for an air compressor in a hybrid commercial vehicle as a function of vehicle air demand and comprises a processor configured to execute computer-executable instructions comprising monitoring vehicle air system pressure, calculating air demand generated by the vehicle air system, and determining that the vehicle air system air demand is greater than a predetermined air demand threshold. A cut-out pressure threshold for the compressor motor is increased and the air compressor motor is switched from an on/off mode to a continuous run mode wherein pressure is maintained in the air system to be between a cut-in pressure threshold and the increased cut-out pressure threshold. The compressor motor operates in the continuous run mode until air demand falls below the predetermined air demand threshold.

21 Claims, 3 Drawing Sheets

AIR DEMAND ADJUSTED COMPRESSOR CONTROL

BACKGROUND

The present application finds particular application in hybrid commercial vehicle brake systems, particularly involving air demand in a vehicle air system. However, it will be appreciated that the described technique may also find application in other air systems, other vehicle systems, or other motor control systems.

In heavy duty hybrid vehicle design, there is often an effort to electrify vehicle subsystems so as to move them off the engine. As these subsystems are electrified, there is a need for these subsystems to intelligently control and optimize their power usage to be in concert with the entire vehicle electrical system. Specifically, there is a problem with existing electric air compressor subsystems within heavy duty hybrid vehicles. Presently, electric air compressor systems are not designed to manage and modify their operation so as to control and optimize the energy used to charge the air tanks for air brake and other pneumatic systems. That is, while electric compressor systems exist on heavy duty hybrid vehicles, there is a problem with these systems in that they do not include an intelligent control of the energy required to maintain the air pressure. These systems do not monitor or utilize existing vehicle information to modify their operation to optimize energy conservation. Existing compressor systems normally turn the compressor on or off at fixed speeds and pressures: the compressor is on at full speed at the lower pressure (cut-in) pressure and off at the higher (cut-out) pressure. Existing electric compressor systems do not dynamically alter their operation to conserve or store energy. Conventional electric compressor systems have no way to optimize energy usage desired to maintain vehicle air pressure or modify the compressor operation based upon vehicle status or energy demands.

Classical compressor control systems do not have the capability to dynamically vary motor speed (RPM) or change the cut-in and/or cut-out pressure thresholds as vehicle operational status and power requirements change. Extant air compressor control systems do not modify their operation during periods of high air demand. High air demand may be caused by high brake demand and/or auxiliary system air demand. High brake demand often occurs in heavy city traffic or on roads undergoing construction. High air demand for auxiliary systems often occurs in city buses with "kneeling" or load-leveling functions to facilitate passenger entry/exit. During periods of high air demand, existing systems turn a compressor motor on or off at fixed cut-in and cut-out pressure thresholds and drive the compressor motor at its fixed maximum RPM. Such conventional systems do not modify their operation to optimize air supply efficiency.

One classical approach relates to an engine driven compressor wherein the engine speed is modified according to the operating needs of the compressor, with discrete engine speeds corresponding to changing air demand. The controller can disengage the compressor from the engine if the air demand is low and other loads need the engine power. Another approach relates to an electronic compressor control system that measures air demand conditions at the reservoir. Under high demand, a pressure unloader valve is used to control the compressor. Under low demand, the controller shuts off the compressor motor entirely.

Another conventional approach relates to an electronically controlled air compressor that absorbs engine energy when the vehicle is coasting by filling the reservoirs to a higher than normal pressure. The compressor is shut off to reduce the load on the engine in certain circumstances, unless the pressure is lower than mandated. Yet another approach relates to a compressor controller that changes the electric drive motor rpm to keep the reservoirs at a set pressure. Other techniques relate to a portable compressed air system. In order to meet an increased air demand, the compressor motor speed is increased. If additional systems need the motor, the compressor can be detached entirely.

Other approaches relate to a system with a main compressor for air brake units powered by the engine and an auxiliary electrically driven compressor for high pressure systems. A central controller determines which compressor should be operational, or both, based on the air demand. In some cases, a compressor control system can vary a target pressure based on vehicle running states, such as anticipated demand of the suspension system, which requires a higher operating pressure than 10 bar. When the vehicle is coasting, the target pressure in the reservoirs is set to be higher to take advantage of free energy of the engine. The target reservoir pressure during the engine off mode is always higher than the engine on mode. Still other techniques relate to an electronically controlled air conditioning compressor. The compressor is driven such that the rotation speed of the compressor is increased when the vehicle speed is decreased. In this manner, the electrical load created by the compressor is reduced and absorbed by the engine.

The present innovation provides new and improved systems and methods for controlling compressor motor operation mode as a function of vehicle air demand in a vehicle air system, which overcome the above-referenced problems and others.

SUMMARY

In accordance with one aspect, a motor controller unit (MCU that facilitates modifying an operation mode for an air compressor motor in a hybrid commercial vehicle as a function of vehicle air demand comprises a memory that stores computer-executable instructions for modifying compressor motor operation mode as a function of vehicle air demand, and a processor configured to execute the computer-executable instructions. The instructions comprise monitoring vehicle air system pressure, calculating air demand generated by the vehicle air system, and determining that the vehicle air system air demand is greater than a predetermined air demand threshold. The instructions further comprise increasing a cut-out pressure threshold and switching the air compressor motor from an on/off mode to a continuous run mode wherein pressure is maintained in the air system to be between a cut-in pressure threshold and the increased cut-out pressure threshold. Additionally, the instructions comprise maintaining the compressor motor in the continuous run mode until air demand falls below the predetermined air demand threshold.

In accordance with another aspect, a method of modifying an operation mode for an air compressor motor in a hybrid commercial vehicle as a function of vehicle air demand comprises monitoring vehicle air system pressure, calculating air demand generated by the vehicle air system, and determining that the vehicle air system air demand is greater than a predetermined air demand threshold. The method further comprises increasing a cut-out pressure threshold and switching the air compressor motor from an on/off mode to a continuous run mode wherein pressure is maintained in the air system to be between a cut-in pressure threshold and the increased cut-out pressure threshold. Additionally, the method comprises maintaining the compressor motor in the continuous run mode until air demand falls below the predetermined air demand threshold.

According to another aspect, a system that facilitates modifying an operation mode for an air compressor motor in a hybrid commercial vehicle as a function of vehicle air demand comprises an air compressor comprising a compressor motor, a brake system that is supplied with air by the air compressor, and comprising a brake pedal, and a motor controller unit (MCU) comprising a processor configured to execute computer-executable instructions for modifying compressor motor operation mode as a function of vehicle air demand. The instructions comprise monitoring vehicle air system pressure, calculating air demand generated by the vehicle air system, and determining that the vehicle air system air demand is greater than a predetermined air demand threshold. The instructions further comprise increasing a cut-out pressure threshold and switching the air compressor motor from an on/off mode to a continuous run mode wherein pressure is maintained in the air system to be between a cut-in pressure threshold and the increased cut-out pressure threshold. Additionally, the instructions comprise maintaining the compressor motor in the continuous run mode until air demand falls below the predetermined air demand threshold.

In accordance with another aspect, an apparatus for modifying an operation mode for an air compressor motor in a hybrid commercial vehicle as a function of vehicle air demand comprises means for monitoring vehicle air system pressure, means for calculating air demand generated by the vehicle air system, and means for determining that the vehicle air system air demand is greater than a predetermined air demand threshold.

The apparatus additionally comprises means for increasing a cut-out pressure threshold and switching the air compressor motor from an on/off mode to a continuous run mode wherein pressure is maintained in the air system to be between a cut-in pressure threshold and the increased cut-out pressure threshold, and means for maintaining the compressor motor in the continuous run mode until air demand falls below the predetermined air demand threshold.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

Systems and methods are described herein that monitor the brake pedal application, brake pedal pressure, and/or total auxiliary air usage to determine whether there is a period of excessive air demand (i.e., above a predetermined air demand threshold), such as occur during frequent braking events. If vehicle air supply is being depleted continuously at a high rate, the compressor is switched from on/off operation mode to a continuous run operation mode. That is, the described intelligent controller changes the operation of the motor compressor from an on/off mode that cuts in and out at specific air pressures to a continuous mode wherein the compressor motor runs continuously. The compressor motor RPM is varied to maintain air pressure within the cut-in (ON) and cut-out (OFF) pressure thresholds such that the compressor motor does not shut off until air demand falls below the predetermined air demand threshold (e.g., when a high air demand event has concluded). The described approach ensures that sufficient vehicle air supply is maintained during periods of high air demand and avoids sudden disturbances on the vehicle power bus and energy losses associated with turning the compressor motor on and off. When the period of high air demand is over, the normal compressor on/off mode based on predetermined cut-in and cut-out pressure resumes.

Figure 1:
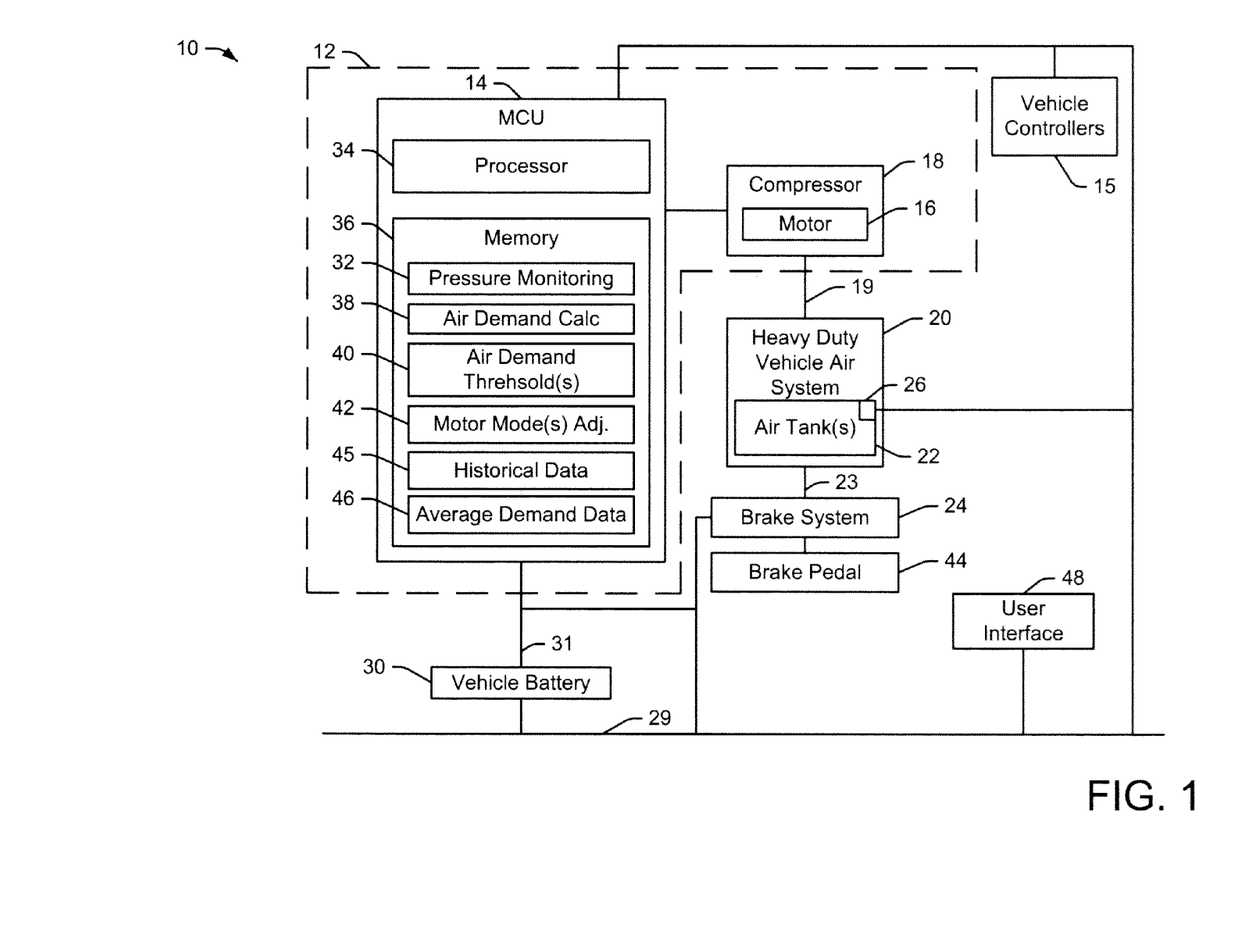
FIG. 1 illustrates an energy management system that executes an energy management algorithm employing an Electric Air Charging System (EACS) to control a mode of operation of an air compressor motor on a hybrid commercial vehicle (or the like) as a function of vehicle air demand.

FIG. 1 illustrates an energy management system 10 that executes an energy management algorithm employing an Electric Air Charging System (EACS) 12 to control a mode of operation of an air compressor motor on a hybrid commercial vehicle (or the like) as a function of vehicle air demand. The EACS 12 comprises an MCU 14 that controls a variable speed, brushless DC (BLDC) motor 16 that drives a compressor 18. Other prime movers, such as an induction motor, are also contemplated. Electrically driven compressor technologies employed in conjunction with the herein-described features can include by way of example and not limitation reciprocating, screw, scroll, rotary, and/or any other suitable type of compressor. The compressor 18 compresses the air and provides, via an air supply line 19, an air pressure supply to a heavy duty vehicle air system 20 that comprises one or more air tanks 22 that are filled by the compressor 18 and which supply air pressure via an air supply line 23 to a brake system 24 and/or other vehicle systems. The herein-described approach provides intelligent and variable control of the air compressor motor as a function of vehicle air system demand in order to manage and improve energy efficiency within a hybrid commercial vehicle or other vehicle.

The MCU 14 communicates with other vehicle controllers 15. Additionally, the MCU communicates with a pressure monitoring device, such as a pressure sensor 26 in the air tank(s) 22, or some other suitable source of real-time air system pressure information, and acquires vehicle air pressure status information over a vehicle serial bus 29 (e.g. a J1939 controller area network (CAN) bus or the like). The MCU continuously or periodically monitors air system pressure in order to intelligently control the energy required to maintain vehicle air pressure.

The system 10 further includes a high voltage vehicle battery 30 that supplies power to various system components. The battery 30 may be, for example, a lithium ion battery, a nickel metal hydride battery, a lead acid battery, a variant of the foregoing battery types, or any other suitable battery. The battery 30 is coupled via power lines 31 to the MCU. Although the battery described herein is a high voltage vehicle battery (e.g., 200V, 300V, etc.), it will be appreciated that the described systems and methods may be employed with any suitable power storage device, as well as with any suitable air compressor or load on the power source.

In one embodiment, the system 10 improves energy efficiencies when driving the electric compressor to charge the air brake and other pneumatic systems. During periods of high air demand (e.g., such as during heavy and/or frequent braking events), rather than turn the compressor on at the predetermined cut-in threshold and off at the predetermined cut-out pressure threshold, the MCU monitors the brake pedal application, brake pedal pressure and total auxiliary air usage to determine air demand. The MCU can change the compressor operation based on the air demand. If the vehicle air supply is being depleted continuously at a high rate (i.e., above the air demand threshold), the MCU changes the compressor from on/off operation to a continuous run operation. The compressor RPM can be varied to maintain air pressure within the cut-in and cut-out thresholds without turning the compressor off. This feature ensures that the vehicle air supply is maintained during the periods of high air demand and avoids sudden disturbances on the power bus and energy losses associated with turning the compressor off and on. When the MCU determines that the period of high air demand is over, the normal compressor on/off operation mode resumes based on predetermined cut-in, cut-out pressure thresholds. By keeping the compressor running at a relatively uniform speed during periods of high air demand, air pressure is maintained while avoiding system disturbances and improving energy efficiency.

The MCU monitors the air demand of the air system 20 of the vehicle to determine whether it is desirable to adjust operating mode of the air compressor motor in order to meet air demand and ensure that there is sufficient air pressure in the air tanks 22 for a braking event or other air usage. The MCU comprises a pressure monitoring module 32 that monitors the pressure in the air tanks 22 of the vehicle (e.g., periodically or continuously) and provides air system pressure information to a processor 34. In one embodiment, the air system pressure information is received from the pressure sensor 26 and stored in memory 36 for evaluation by the processor 34.

The memory additionally stores an air demand calculation module 38 that calculates air demand in the air system 20 from the monitored air system pressure information. The memory further stores one or more air demand threshold values 40 and an air compressor motor operation mode module 42 that, when executed by the processor, compares the calculated air demand to an air demand threshold value and determines whether the calculated air demand is greater than or equal to the predetermined air demand threshold. If not, then the MCU continues to monitor air system pressure. If the calculated air demand is greater than or equal to the predetermined air demand threshold, then the processor executes a motor mode adjustment module 42 that switches the air compressor operation mode from an on/off mode to a continuous run mode in order to ensure that air demand is met until the air demand falls back below the predetermined air demand threshold, at which time the motor mode adjustment module sends a command to the compressor motor to return to on/off mode. By controlling motor speed to be near a speed that maintains system pressure between the cut-in and cut-out pressure thresholds, the motor is not required to run at maximum speed, and thereby wear on the electric compressor system is reduced. In one embodiment, the predetermined air demand threshold is in the range of 50%-75% of a maximum air demand rating for the air system, or some other suitable percentage of the maximum air demand (e.g., 10% to 100%, etc.). In another embodiment, the air demand threshold is greater than a predetermined percentage (e.g., 10%, 15%, etc.) of maximum air demand for the compressor.

According to an example, nominal cut-out pressure may be 130 psig, and nominal air demand may be 5 standard cubic feet per minute (scfm). Maximum air demand that can be sustained at 130 psig may be 15 scfm, at 130 psig, in this example. Therefore, the air demand threshold is set to twice the average air demand, or 10 scf/m, so that if air demand exceeds 10 scfm, the cut-out pressure threshold is raised (e.g., to 150 psig) and the motor mode is changed to continuous run mode so that air demand can be satisfied even if 15 scfm demand is reached. It will be appreciated that the air demand threshold can be set to any desired calculated or predetermined value, such as by multiplying calculated average air demand by a predetermined factor (e.g., 1.5, 2, 2.5, etc.).

In on/off mode, the compressor motor 16 switches on when air tank pressure falls below a predetermined cut-in pressure (e.g., 110 psig or some other suitable pressure threshold, which may be a function of compressor and/or motor type). When the motor has increased the air tank pressure to a predetermined cut-out pressure (e.g., 130 psig or some other suitable pressure threshold, which may be a function of compressor and/or motor type and/or vehicle type and/or number of connected trailers), the compressor shuts off. In order to operate the motor 16 in a continuous run mode, the MCU processor 34 executes the motor mode adjustment module 42 to increase the cut-out pressure threshold and the motor mode is changed to cause the motor to continuously operate by varying its speed to maintain the air system pressure between the cut-in pressure threshold and the increased cut-out pressure threshold. That is, the motor can additionally adjust its operating speed in a manner such that when the pressure in the air tanks approaches the increased cut-out pressure threshold (e.g., 140 psig, 150 psig, or some other predetermined increased motor cut-out pressure threshold, which may be a function of compressor type and/or motor type, etc.), the motor reduces its speed, without shutting off, so that the pressure in the air tanks does not reach the cut-out pressure threshold. Similarly, as pressure in the air tanks falls toward the cut-in pressure, the motor increases its speed (e.g., in response to a command form the MCU) so that the pressure in the air tanks increases toward the cut-out pressure threshold. In this mariner, the motor is in a continuous run state until air demand in the air system 20 falls back below the predetermined air demand threshold. That is, once air demand falls below the predetermined air demand threshold, the cut-out pressure threshold for the compressor motor is reduced back to a nominal cut-out pressure threshold (e.g., 130 psig or the like), which is greater than the cut-in pressure threshold (e.g., 110 psig or the like), and switching the air compressor motor from the continuous run mode back to the on/off mode.

In another embodiment, the MCU receives information related to brake pedal application and/or pressure applied to a brake pedal 44 on the vehicle. For instance, the MCU can receive information indicating that the brake pedal has been repetitively depressed, and can automatically increase the cut-out pressure threshold and change the motor mode to switch the compressor motor to continuous run mode until the brake pedal is released. In another example, the magnitude and/or cycle rate of the pressure applied to the brake pedal is monitored by the MCU, which responds by increasing the cut-out pressure threshold to a predetermined increased level and change the motor mode to cause the compressor motor to enter continuous run mode until the brake pedal is released. In this example, the increased cut-out pressure level can be a function of the magnitude of the brake pedal pressure or depression.

In another embodiment, the processor collects historical air demand data 45 and calculates an average air demand 46 (e.g., 5 scf/m or some other average air demand value) for a predetermined unit of time. The historical air demand data can be collected over a predetermined time period (e.g., one minute, 5 minutes, an hour, a week, etc.), after which historical data is collected for a subsequent predetermined time period. Additionally, the average air demand value can be updated periodically, such as upon expiration of the predetermined time period or a portion thereof. The predetermined air demand threshold can be set to any desired value, such as 1.5 times the average air demand value, 2 times the average air demand value, etc., and can be periodically updated (e.g., whenever the average air demand value is updated).

In another embodiment, the processor collects historical air demand data 45 and continuously calculates an average air demand 46 based on a rolling average of the most recent historical data collected over a predetermined period of time (e.g. air demand is calculated every 1 second based on the historical data collected over the last 5 minutes, the last 60 minutes, the last 7 days, etc.). In this way the average air demand can more closely track the current vehicle operating conditions and can more accurately adjust the air demand threshold accordingly. For example, a refuse vehicle route may have changed from a rural route to a city route. In the case of the city route, the air demand threshold may be adjusted upward to account for the normally heavier air demand encountered with more frequent stops associated with a city route.

In another embodiment, the MCU sends an alert to the driver via a user interface 48 when high air demand lasts for a predetermined time period (e.g., 5 minutes or more, or some other predetermined time period). Lengthy periods of high air demand may be indicative of a leak in the air system.

It will further be appreciated that although FIG. 1 depicts the system 10 as comprising an air compressor that is operably coupled to an MCU that performs the described functions, in another embodiment the MCU and motor are integral to the air compressor 18 and/or the EACS component 12.

Figure 2:
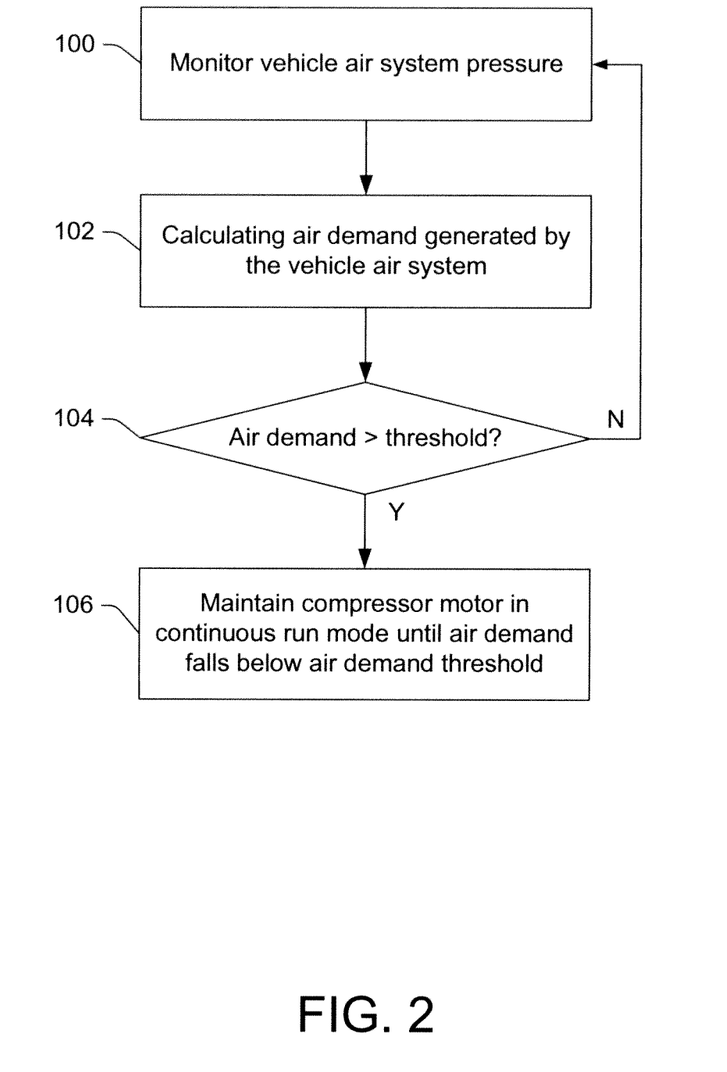
FIG. 2 illustrates a method for controlling anon-hoard air compressor motor on a hybrid commercial vehicle as a function of vehicle air demand, such as is performed by the MCU and/or the processor.

FIG. 2 illustrates a method for controlling an on-board air compressor motor on a hybrid commercial vehicle as a function of vehicle air demand, such as is performed by the MCU 14 and/or the processor 34 (FIG. 1). At 100, vehicle system air pressure is monitored. For instance, information related to pressure in the vehicle air system can be received from a pressure sensor mounted in one or more air tanks. At 102, air demand generated by the vehicle air system is calculated from the monitored air pressure information. At 104, a determination is made regarding whether the air demand is greater than a predetermined air demand threshold. If not, then the method reverts to 100 for continued air pressure monitoring. In one example, the predetermined air demand threshold is in the range of 50%-75% of a maximum air demand rating for the air system or the compressor supplying the air system.

If the determination at 104 indicates that the air demand is greater than the predetermined threshold, then at 106, a cut-out pressure threshold for the compressor motor is increased (i.e., from a nominal pressure threshold such as 130 psig or some other nominal pressure threshold), and the air compressor motor is switched from an on/off mode to a continuous run mode wherein pressure is maintained in the air system to be between a motor cut-in pressure threshold and the increased motor cut-out pressure threshold. At 106, the compressor motor is maintained in the continuous run mode until air demand falls below the predetermined air demand threshold.

In one embodiment, historical air demand data is collected over a predetermined time period, and an average air demand value for the vehicle air system is calculated. Based on the average air demand calculated over each successive time period, the average air demand value is periodically updated. The predetermined air demand threshold can be set at approximately twice the average air demand value, and periodically updating the predetermined air demand threshold. In another embodiment, a rolling average air demand value is calculated from the historical air demand data.

In another embodiment, when air demand falls below the predetermined air demand threshold, the method comprises reducing the cut-out pressure threshold for the compressor motor back to a nominal cut-out pressure threshold, which is greater than the cut-in pressure threshold, and switching the air compressor motor from the continuous run mode to the on/off mode. Additionally or alternatively, brake pedal activation can be monitored, and the cut-out pressure threshold of the compressor motor can be adjusted as a function of brake pedal activation (e.g., pressure applied thereto, distance of brake pedal depression, etc.) and the motor mode is changed to enter continuous run mode.

Figure 3:
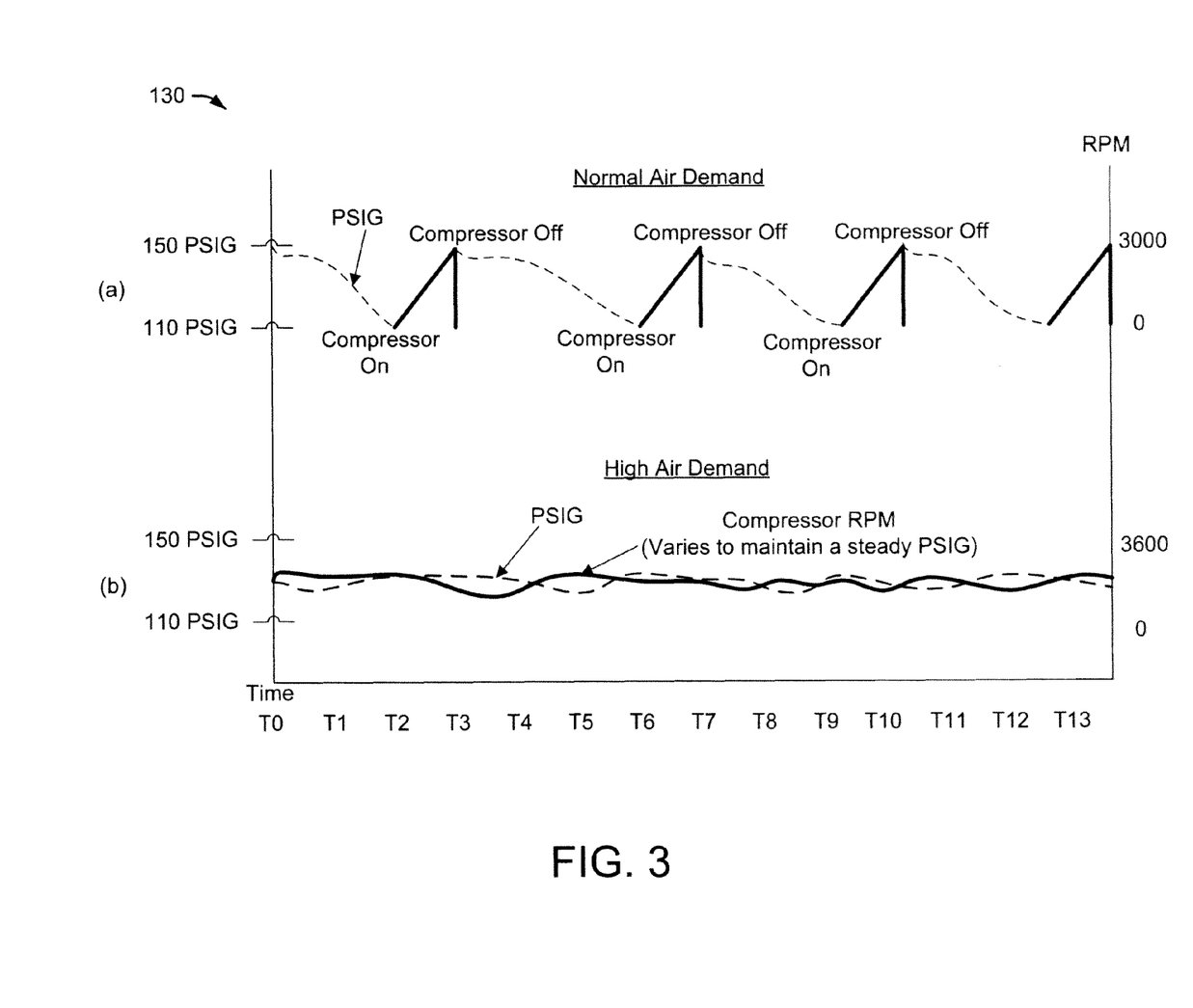
FIG. 3 illustrates a graph depicting air demand adjusted compressor control of a compressor motor during (a) on/off mode operation during normal air demand and (b) continuous mode operation during high air demand (i.e., above the air demand threshold).

FIG. 3 illustrates a graph 130 depicting air demand adjusted compressor control of a compressor motor during (a) on/off mode operation during normal air demand and (b) continuous mode operation during high air demand (i.e., above the air demand threshold). Compressor motor RPM is shown in bold solid lines, while air pressure is shown by dashed lines. In the depicted example, the cut-in pressure threshold is 110 psig, and the cut-out pressure threshold is 150 psig. However, it will be appreciated that the described pressure thresholds are illustrative in nature and that other pressure thresholds (which may be a function of compressor and/or motor type and/or vehicle type) may be employed in conjunction with the herein described systems and methods. During periods of normal air demand as shown at (a) (i.e., air demand below a predetermined and/or periodically calculated air demand threshold), the compressor turns on when monitored air pressure drops to or below the cut-in pressure threshold. The compressor motor ramps from 0 RPM up to a nominal operating RPM (e.g., 3000 in FIG. 3, although other nominal operating speeds are contemplated, which may be a function of compressor motor type, pressure thresholds, and the like). When air pressure in the system reaches the cut-out pressure threshold, the compressor motor shuts off and drops back to 0 RPM. Systems air pressure drops back to toward the cut-in pressure threshold, at which point the compressor motor turns back on and ramps up from 0 RPM to the nominal operation motor speed.

When air demand is above the air demand threshold as shown at (b), compressor RPM is varied (e.g., via the MCU) to maintain the air system pressure between the cut-in and cut-out pressures. In another embodiment, the cut-out pressure threshold is increased to a maximum air system pressure rating and the motor mode is changed so that the compressor motor does not turn off. Once the air demand falls back below the air demand threshold, the cut-out pressure threshold is reduced back to the nominal cut-out threshold level and the motor mode is changed to re-enter on/off mode. If systemic air demand does not fall below the air demand threshold within a predetermined time period (e.g., 1 minute, 5 minutes, 10 minutes, 60 minutes, or some other predetermined time period), then an alert can be sent to the vehicle operator (e.g., via an onboard user interface or the like) to signal an air system fault (e.g., a leak or the like that causes air demand to remain above the air demand threshold).

The herein-described systems and methods manage the energy used to drive the electric compressor motor to charge the air brake and other pneumatic systems in a hybrid commercial vehicle. The MCU also communicates with other intelligent controllers to harmonize its energy usage and operation with other subsystems. The system monitors vehicle operation and modifies compressor motor operation to improve energy efficiency. During periods of high air demand, rather than turn the compressor on and off at the cut-in and cut-out pressure thresholds, the system runs the compressor continuously to maintain air pressure. The described approach avoids losses associated with overcoming inertia each time the compressor is turned off and then on again, as well as avoids disturbances to the electrical system of the vehicle when the compressor is turned off and on, such as high voltage DC spikes and dips, and current spikes. Such disturbances have a negative effect on power quality and cause power inefficiencies. By keeping the compressor running at a relatively uniform speed during periods of high air demand, air pressure is maintained while avoiding system disturbances and improving energy efficiency.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. An motor controller unit (MCU) that facilitates modifying an operation mode for an air compressor motor in a hybrid commercial vehicle as a function of vehicle air demand, comprising:
   a memory that stores computer-executable instructions for modifying compressor motor operation mode as a function of vehicle air demand;
   a processor configured to execute the computer-executable instructions, the instructions comprising:
   monitoring vehicle air system pressure;
   calculating air demand generated by the vehicle air system;
   determining that the vehicle air system air demand is greater than a predetermined air demand threshold;
   increasing a cut-out pressure threshold for the compressor motor and switching the air compressor motor from an on/off mode to a continuous run mode wherein pressure is maintained in the air system to be between a cut-in pressure threshold and the increased cut-out pressure threshold; and
   maintaining the compressor motor in the continuous run mode until air demand falls below the predetermined air demand threshold.

2. The motor controller unit according to claim 1, the instructions further comprising collecting historical air demand data over a predetermined time period, and calculating an average air demand value for the vehicle air system.

3. The motor controller unit according to claim 2, the instructions further comprising periodically updating the average air demand value.

4. The motor controller unit according to claim 2, the instructions further comprising setting the predetermined air demand threshold to be approximately twice the average air demand value, and periodically updating the predetermined air demand threshold.

5. The motor controller unit according to claim 2, the instructions further comprising continuously calculating a rolling average air demand value that is calculated from the historical air demand data, and calculating the predetermined air demand threshold by multiplying the rolling average air demand value by a predetermined factor.

6. The motor controller unit according to claim 1, wherein the information related to pressure in the vehicle air system is received from a pressure sensor mounted in one or more air tanks.

7. The motor controller unit according to claim 1, wherein the predetermined air demand threshold is in the range of 50%-75% of a maximum air demand rating for the air system.

8. The motor controller unit according to claim 1, the instructions further comprising, when air demand falls below the predetermined air demand threshold, reducing the cut-out pressure threshold for the compressor motor back to a nominal cut-out pressure threshold, which is greater than the cut-in pressure threshold, and switching the air compressor motor from the continuous run mode to the on/off mode.

9. The motor controller unit according to claim 1, the instructions further comprising monitoring brake pedal activation and adjusting the cut-out pressure threshold of the compressor motor as a function of brake pedal activation while causing the compressor motor to enter continuous run mode when vehicle air system air demand is greater than the predetermined air demand threshold.

10. A method of modifying an operation mode for an air compressor motor in a hybrid commercial vehicle as a function of vehicle air demand, comprising:
    monitoring vehicle air system pressure;
    calculating air demand generated by the vehicle air system;
    determining that the vehicle air system air demand is greater than a predetermined air demand threshold;
    increasing a cut-out pressure threshold for the compressor motor and switching the air compressor motor from an on/off mode to a continuous run mode wherein pressure is maintained in the air system to be between a cut-in pressure threshold and the increased cut-out pressure threshold; and
    maintaining the compressor motor in the continuous run mode until air demand falls below the predetermined air demand threshold.

11. The method according to claim 10, further comprising collecting historical air demand data over a predetermined time period, calculating an average air demand value for the vehicle air system, and periodically updating the average air demand value.

12. The method according to claim 11, further comprising setting the predetermined air demand threshold to be approximately twice the average air demand value, and periodically updating the predetermined air demand threshold.

13. The method according to claim 11, further comprising continuously calculating a rolling average air demand value that is calculated from the historical air demand data, and calculating the predetermined air demand threshold by multiplying the rolling average air demand value by a predetermined factor.

14. The method according to claim 10, wherein the information related to pressure in the vehicle air system is received from a pressure sensor mounted in one or more air tanks.

15. The method according to claim 10, wherein the predetermined air demand threshold is in the range of 50%-75% of a maximum air demand rating for the air system.

16. The method according to claim 10, further comprising, when air demand falls below the predetermined air demand threshold, reducing the cut-out pressure threshold for the compressor motor back to a nominal cut-out pressure threshold, which is greater than the cut-in pressure threshold, and switching the air compressor motor from the continuous run mode to the on/off mode.

17. The method according to claim 10, further comprising monitoring brake pedal activation and adjusting the cut-out pressure threshold of the compressor motor as a function of brake pedal activation while causing the compressor motor to enter continuous run mode when vehicle air system air demand is greater than the predetermined air demand threshold.

18. A system that facilitates modifying an operation mode for an air compressor motor in a hybrid commercial vehicle as a function of vehicle air demand, comprising:
- an air compressor comprising a compressor motor;
- a brake system that is supplied with air by the air compressor, and comprising a brake pedal; and
- a motor controller unit (MCU) comprising a processor configured to execute computer-executable instructions for modifying compressor motor operation mode as a function of vehicle air demand, the instructions comprising:
  - monitoring vehicle air system pressure;
  - calculating air demand generated by the vehicle air system;
  - determining that the vehicle air system air demand is greater than a predetermined air demand threshold;
  - increasing a cut-out pressure threshold for the compressor motor and switching the air compressor motor from an on/off mode to a continuous run mode wherein pressure is maintained in the air system to be between a cut-in pressure threshold and the increased cut-out pressure threshold; and
  - maintaining the compressor motor in the continuous run mode until air demand falls below the predetermined air demand threshold.

19. The system according to claim 18, the instructions further comprising monitoring brake pedal activation and adjusting the cut-out pressure threshold of the compressor motor as a function of brake pedal activation while causing the compressor motor to enter continuous run mode when vehicle air system air demand is greater than the predetermined air demand threshold.

20. The system according to claim 18, the instructions further comprising, when air demand falls below the predetermined air demand threshold, reducing the cut-out pressure threshold for the compressor motor back to a nominal cut-out pressure threshold, which is greater than the cut-in pressure threshold, and switching the air compressor motor from the continuous run mode to the on/off mode.

21. An apparatus for modifying an operation mode for an air compressor motor in a hybrid commercial vehicle as a function of vehicle air demand, comprising:
- means for monitoring vehicle air system pressure;
- means for calculating air demand generated by the vehicle air system;
- means for determining that the vehicle air system air demand is greater than a predetermined air demand threshold;
- means for increasing a cut-out pressure threshold for the compressor motor and switching the air compressor motor from an on/off mode to a continuous run mode wherein pressure is maintained in the air system to be between a cut-in pressure threshold and the increased cut-out pressure threshold; and
- means for maintaining the compressor motor in the continuous run mode until air demand falls below the predetermined air demand threshold.

* * * * *

UNITED STATES PATENT AND TRADEMARK OFFICE
CERTIFICATE OF CORRECTION

| | | |
|---|---|---|
| PATENT NO. | : 8,467,950 B1 | |
| APPLICATION NO. | : 13/368517 | |
| DATED | : June 18, 2013 | |
| INVENTOR(S) | : David J. Pfefferl et al. | |

It is certified that error appears in the above-identified patent and that said Letters Patent is hereby corrected as shown below:

In the Specifications:

Column 2, line 38, "(MCU that" should read --(MCU) that--

Column 3, line 54, "anon-hoard" should read --an on-board--

Column 5, line 28, "fora" should read --for a--

Column 6, line 65, "fora" should read --for a--

Signed and Sealed this
Sixth Day of August, 2013

Teresa Stanek Rea
*Acting Director of the United States Patent and Trademark Office*